(12) United States Patent
Moon et al.

(10) Patent No.: US 10,366,021 B2
(45) Date of Patent: Jul. 30, 2019

(54) MEMORY SYSTEM INCLUDING DRAM CACHE AND CACHE MANAGEMENT METHOD THEREOF

(71) Applicant: SAMSUNG ELECTRONICS CO., LTD., Suwon-si, Gyeonggi-do (KR)

(72) Inventors: Sungup Moon, Seoul (KR); Tae-Kyeong Ko, Hwaseong-si (KR); Do-Han Kim, Hwaseong-si (KR); Jongmin Park, Busan (KR); Kyoyeon Won, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 30 days.

(21) Appl. No.: 15/390,063

(22) Filed: Dec. 23, 2016

(65) Prior Publication Data
US 2017/0192888 A1 Jul. 6, 2017

(30) Foreign Application Priority Data

Dec. 30, 2015 (KR) .................. 10-2015-0190027

(51) Int. Cl.
*G06F 13/16* (2006.01)
*G06F 12/08* (2016.01)
*G06F 12/0804* (2016.01)
*G06F 13/40* (2006.01)
*G06F 12/0868* (2016.01)

(52) U.S. Cl.
CPC ...... *G06F 13/1689* (2013.01); *G06F 12/0804* (2013.01); *G06F 12/0868* (2013.01); *G06F 13/4068* (2013.01); *G06F 2212/1016* (2013.01); *G06F 2212/2022* (2013.01)

(58) Field of Classification Search
CPC ............ G06F 12/0804; G06F 12/0868; G06F 13/1689; G06F 1/12; G06F 13/4068; G06F 2212/1016; G06F 2212/2022
USPC ........................................ 711/119
See application file for complete search history.

(56) References Cited

U.S. PATENT DOCUMENTS

| 6,931,495 | B2 | 8/2005 | Nakada |
| 6,976,130 | B2 | 12/2005 | Chi |
| 7,454,575 | B2 | 11/2008 | Nakanishi et al. |
| 7,555,610 | B2 | 6/2009 | Okabayashi et al. |
| 7,679,133 | B2 | 3/2010 | Son et al. |
| 8,443,152 | B2 | 5/2013 | Lee et al. |

(Continued)

FOREIGN PATENT DOCUMENTS

| JP | 10-275112 | 10/1998 |
| JP | 10-320274 | 12/1998 |
| KR | 10-1474843 | 12/2014 |

*Primary Examiner* — Hua J Song
(74) *Attorney, Agent, or Firm* — F. Chau & Associates, LLC

(57) ABSTRACT

A memory system includes a nonvolatile memory electrically connected to a data bus, a DRAM electrically connected to the data bus, and a memory controller configured to drive the DRAM as a cache memory and the nonvolatile memory as a main memory and to synchronize data of a cache line with data of the nonvolatile memory in units of cache units based on a dirty flag. The DRAM is configured to load data of the cache line that caches data stored in the nonvolatile memory and to store the dirty flag, which indicates whether a cache unit is dirty, in units of cache units, where a size of each cache unit is smaller than a size of the cache line.

13 Claims, 13 Drawing Sheets

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,654,587 B2 | 2/2014 | Yoon et al. |
| 2003/0033492 A1* | 2/2003 | Akiyama ............ G06F 12/0893 |
| | | 711/156 |
| 2011/0107143 A1 | 5/2011 | Nakatsuka |
| 2011/0167224 A1 | 7/2011 | Isono |
| 2011/0233648 A1 | 9/2011 | Seol et al. |
| 2014/0149685 A1 | 5/2014 | Liang et al. |
| 2014/0244902 A1 | 8/2014 | Simionescu et al. |
| 2015/0264112 A1 | 9/2015 | Ge et al. |
| 2017/0083444 A1* | 3/2017 | Dev .................... G06F 12/0871 |

* cited by examiner

MEMORY SYSTEM INCLUDING DRAM CACHE AND CACHE MANAGEMENT METHOD THEREOF

CROSS-REFERENCE TO RELATED APPLICATIONS

This application claims priority under 35 U.S.C. § 119 to Korean Patent Application No. 10-2015-0190027 filed Dec. 30, 2015, in the Korean Intellectual Property Office, the disclosure of which is incorporated by reference herein.

BACKGROUND

1. Technical Field

The inventive concept described herein relates to a semiconductor memory, and more particularly relates to a memory system that uses a DRAM as a cache and a cache management method thereof.

2. Discussion of Related Art

A semiconductor memory may refer to a memory device that is implemented using a semiconductor such as silicon (Si), germanium (Ge), gallium arsenide (GaAs), or indium phosphide (InP). A semiconductor memory device may be classified as a volatile memory device or a nonvolatile memory device. A volatile memory device is a type of storage device whose contents are erased when the system's power is turned off or interrupted. A nonvolatile memory device is a type of memory that can retrieve stored information even after having been power cycled.

A flash memory is widely used as the nonvolatile memory device since it has a large capacity, is quiet, and uses little power. In particular, a flash memory-based solid state drive (SSD) is used as mass storage in a personal computer, a notebook, a workstation, a server system, and the like. In addition, the SSD may be used as a nonvolatile mass storage that is over-writable and nonvolatile.

A storage system may use a dynamic random access memory (DRAM) as a cache memory and a nonvolatile memory as a storage device. However, various issues may occur because the DRAM communicates data in a different manner from the nonvolatile memory.

SUMMARY

At least one embodiment of the inventive concept provides a cache management method that may prevent bus efficiency from being lowered due to differences in sizes of data exchanged between a main memory and a cache in a system using a nonvolatile memory module as the main memory and a DRAM as a cache and a memory system using the cache management method.

According to an exemplary embodiment of the inventive concept, a memory system include a nonvolatile memory electrically connected to a data bus, a DRAM electrically connected to the data bus, and a memory controller configured to drive the DRAM as a cache memory and the nonvolatile memory module as a main memory and to synchronize data of a cache line with data of the nonvolatile memory module in units of cache units based on a dirty flag. The DRAM is configured to load data of the cache line that caches data stored in the nonvolatile memory and to store the dirty flag, which indicates whether a cache unit is dirty, in units of the cache units, where a size of each cache unit is smaller than a size of the cache line.

According to an exemplary embodiment of the inventive concept, a cache management method of a memory system that includes a nonvolatile memory and a DRAM includes storing data stored in the nonvolatile memory in a cache line of the DRAM and performing a cache update operation in units of cache units constituting the cache line, storing a dirty flag indicating whether each of the cache units is in a dirty state or a clean state, reading the dirty flag to determine the dirty state of each of the cache units, reading cache units, which are detected as having the dirty state, from among the plurality of cache units from the DRAM, and flushing the read cache units to the nonvolatile memory module.

According to an exemplary embodiment of the inventive concept, a memory device configured as a cache memory includes a DRAM device including a first cell region configured to store cache units constituting a cache line and a second cell region configured to store a dirty flag indicating a dirty state of each of the cache units, and a cache controller configured to determine the dirty state of each of the cache units based on an address provided according to a write request from an external device and to update the second cell region based on the determined dirty state of each of the cache units.

According to an exemplary embodiment of the inventive concept, a method of performing cache synchronization with respect to a cache line stored in a cache memory is provided. The method includes a memory controller retrieving a dirty flag associated with the cache line from the cache memory. The cache line includes a plurality of parts and the dirty flag indicates whether each part is in a dirty state or a clean state. The method further includes the memory controller retrieving one of the parts of the cache line indicated by the dirty flag as being in the dirty state. The method further includes the memory controller writing the retrieved part to a main memory.

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION

Figure 1:
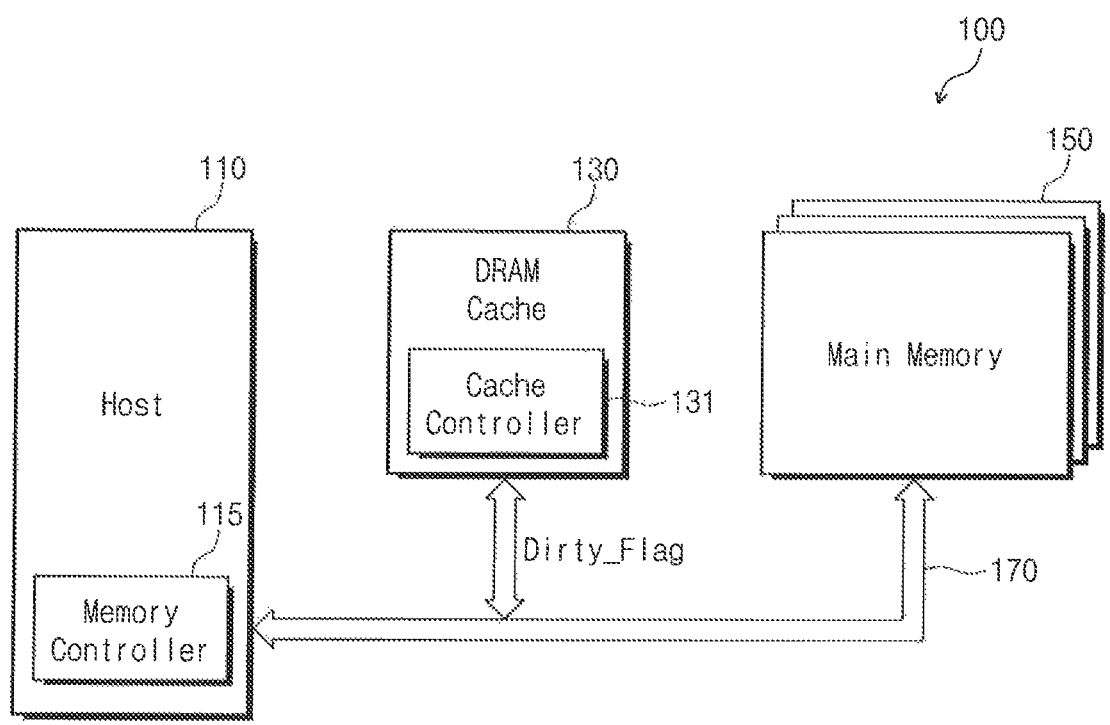
FIG. 1 is a block diagram illustrating a memory system according to an exemplary embodiment of the inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 is a block diagram illustrating a memory system according to an exemplary embodiment of the inventive concept. Referring to FIG. 1, a memory system 100 includes a host 110, a DRAM cache 130, and a main memory 150 that are connected through a memory bus 170.

The host 110 may process data or may control elements included in the memory system 100. For example, the host 110 may drive various operating systems and may execute various applications on an operating system. The host 110 may write data into the main memory 150 or may read data stored in the main memory 150. The host 110 may load data onto the main memory 150 and may perform various operations based on the loaded data. For example, the host 110 may include a central processing unit (CPU) that controls the memory system 100.

The host 110 includes a memory controller 115 that controls the DRAM cache 130 and the main memory 150. To read data stored in the main memory 150, the host 110 may provide a read request to the memory controller 115.

To read data that the host 110 requests, the memory controller 115 may access the main memory 150. In particular, the memory controller 115 may use the DRAM cache 130 as a cache memory of the main memory 150. That is, the memory controller 115 may store data, which is stored in the main memory 150, in a cache line of the DRAM cache 130. The memory controller 115 may access the cache line in place of the main memory 150. For example, if original data is stored in the main memory 150 and a copy of the original data is stored in a cache line of the DRAM cache 130, the memory controller 115 may access the copy in the DRAM cache 130 to retrieve the data. Moreover, the memory controller 115 may perform efficient cache synchronization with reference to a dirty flag provided from the DRAM cache 130. For example, if the host 110 updates the copy in the DRAM cache 130, it may be necessary to update the original data in the main memory 150.

The DRAM cache 130 may be provided as a cache memory of the host 110. The DRAM cache 130 may include a plurality of cache lines corresponding to specific memory units (e.g., devices, cards, etc.) of the main memory 150, respectively. Furthermore, the DRAM cache 130 may store data, which is stored in a specific memory unit of the main memory 150, in a cache line mapped thereto. In this case, since the host 110 accesses a cache line instead of a specific memory unit of the main memory 150, the host 110 may read or write data at a high speed.

The DRAM cache 130 according to an embodiment of the inventive concept provides a dirty flag for a corresponding cache line or a data unit (hereinafter referred to as "cache unit"), of which the size is smaller than that of the cache line, in response to the request of the host 110. In an embodiment, the DRAM cache 130 stores dirty flags for each of a plurality of cache units included in the cache line and provides the stored dirty flags to the host 110. The DRAM cache 130 may provide a signal to the host 110 that represents a stored dirty flag. For example, the signal may identify a given cache line and a given part of the cache line that corresponds to the cache unit that stores a copy of data not matching the original data stored in the main memory 150. Each of the dirty flags may be a value, indicating synchronization with the main memory 150, about each of the cache units included in one cache line. In an embodiment, a dirty state of a dirty flag corresponding to one of the cache units included in the cache line means that data stored in the main memory 150 is mismatched with data stored in a cache line in the DRAM cache 130. For example, if a program variable is initially stored with a first value in the main memory 150 and stored in a first cache unit of a first cache line of the DRAM cache 130, and the program variable in the first cache unit is then set to a second value, this would cause a mismatch. In this case, the memory controller 115 may select only a cache unit of the dirty state to request a write operation to the main memory 150. Accordingly, an occupancy rate of a memory bus for a dirty line synchronization operation between the DRAM cache 130 and the main memory 150 may relatively decrease. The dirty line synchronization operation will be described in more detail below.

The DRAM cache 130 includes a cache controller 131 managing the dirty flag. The cache controller 131 may update the dirty flag based on an address included in a write request from the host 110. When a cache line or a cache unit is updated based on write-requested data, the cache controller 131 sets the dirty flag corresponding to the updated cache line or cache unit to a dirty state. In contrast, when the write-requested data is cached for the first time from the main memory 150 to a new cache line of the DRAM cache 130, the cache controller 131 initializes a corresponding dirty flag to have a clean state. Alternatively, when the dirty flag is reset to a clean state and when a cache line or a cache unit is updated, a corresponding dirty flag is updated to have a dirty state. The dirty flag may be updated by the cache controller 131. The main memory 150 may be implemented with a memory device or a memory module including a nonvolatile memory.

The main memory 150 may be implemented with a memory device or memory module including nonvolatile memories. In an embodiment, the main memory 150 includes memory devices which have a larger capacity as compared with the DRAM cache 130. The main memory 150 may include a nonvolatile memory device that is overwritable and a nonvolatile memory that is not overwritable. The main memory 150 may include, for example, a plurality of flash memories. In an embodiment, the nonvolatile memory 150 may be implemented with a variety of nonvolatile memory devices such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

In an embodiment, the main memory 150 includes a three-dimensional (3D) memory array. The 3-D memory array may be monolithically formed in one or more physical level(s) of a memory cell array having an active area arranged on a circuit related on a silicon substrate and an operation of memory cells. The circuit related to an operation of memory cells may be located in a substrate or on a substrate. The term "monolithic" means that layers of each level of the array are directly deposited on the layers of each underlying level of the array.

In an embodiment of the inventive concept, the 3-dimensional memory array has a vertical-directional characteristic, and may include vertical NAND strings in which at least one memory cell is located on another memory cell. The at least one memory cell may comprise a charge trap layer. Each vertical NAND string may include at least one select transistor located over memory cells. The at least one select transistor having the same structure with the memory cells and being formed monolithically together with the memory cells.

The following patent documents, which are hereby incorporated by reference, describe suitable configurations for three-dimensional memory arrays, in which the three-dimensional memory array may be configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The memory bus 170 may be provided as an exchange path through which data, control signals, and a clock signal are exchanged between the host 110, the DRAM cache 130, and the main memory 150. A unit of data exchanged between the DRAM cache 130 and the host 110 may be different in size from a unit of data exchanged between the host 110 and the main memory 150. For example, the DRAM cache 130 may exchange data with the host 110 in units of 64-Byte. That is, a protocol of the memory bus 170 may be defined such that the host 110 and the DRAM cache 130 exchange data having a burst length of 8 through 64 bits. On the other hand, the protocol of the memory bus 170 may be defined such that the host 110 and the main memory 150 exchange data in units of packets each having 512 Bytes. That is, according to a characteristic of an internal operation, the data input/output unit of the main memory 150 may be different from that of the cache memory 130.

Here, the memory bus 170 may include at least one of, for example, a double data rate (DDR), a DDR2, a DDR3, a DDR4, a low power DDR (LPDDR), a universal serial bus (USB), a multimedia card (MMC), an embedded MMC (eMMC), a peripheral component interconnection (PCI), a PCI-express (PCI-E), an advanced technology attachment (ATA), a serial-ATA, a parallel-ATA, a small computer small interface (SCSI), an enhanced small disk interface (ESDI), an integrated drive electronics (IDE), a firewire, a universal flash storage (UFS), or a nonvolatile memory express (NVMe).

With the above-described configuration, the memory system 100 according to an embodiment of the inventive concept flushes data sized smaller than that of a cache line, into the main memory 150 based on a dirty flag managed in the cache memory 130. That is, only cache units, which are detected as having a dirty state, from among a plurality of cache units included in a cache line are flushed to the main memory 150. The memory system 100 may check a dirty state of a cache unit, of which the size is smaller than that of a cache line, based on the dirty flag. Thus, it may be possible to flush cache units sized smaller than a cache line to the main memory 150. According to an embodiment of the inventive concept, the occupancy rate of the memory bus 170 used for dirty line synchronization between the main memory 150 and the DRAM cache 130 may markedly decrease.

Figure 2:
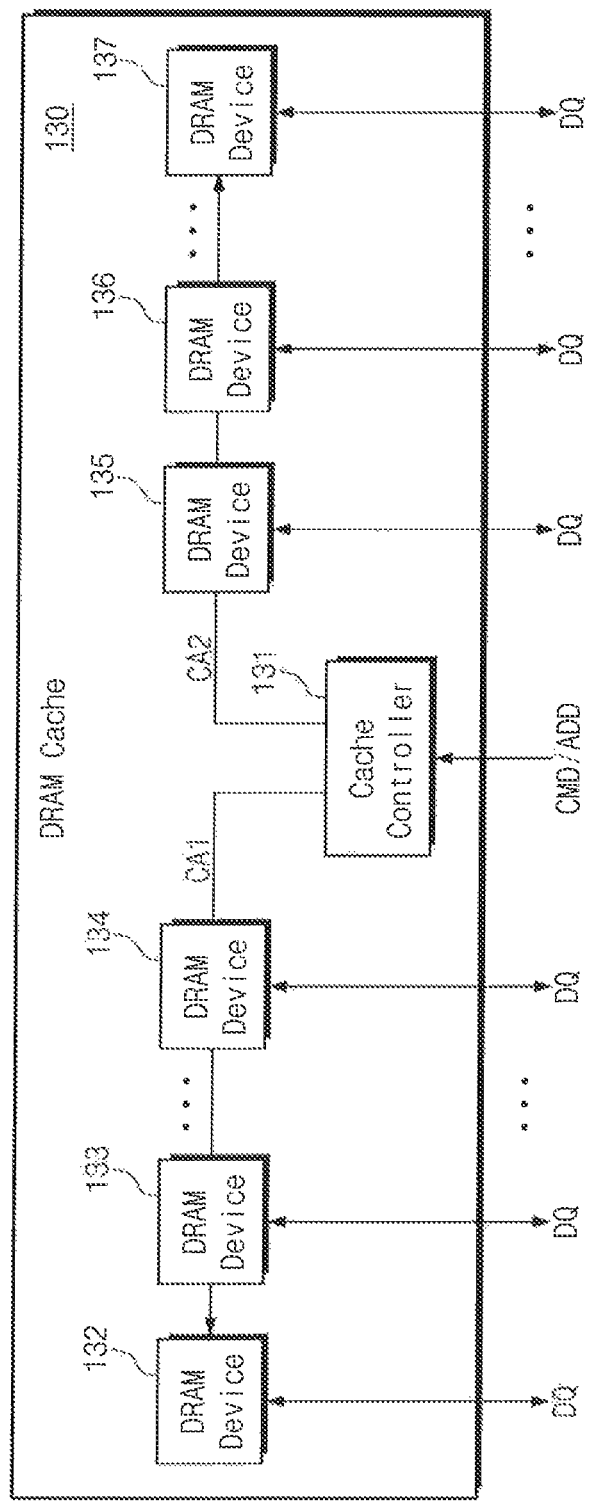
FIG. 2 is a block diagram illustrating a DRAM cache according to an exemplary embodiment of the inventive concept.

FIG. 2 is a block diagram illustrating a DRAM cache according to an exemplary embodiment of the inventive concept. Referring to FIG. 2, the DRAM cache 130 according to an embodiment of the inventive concept is provided in the form of memory module that includes the cache controller 131 and a plurality of DRAM devices 132 to 137. However, the DRAM cache 130 may be implemented with a single chip or multi-chip as well as the memory module.

The DRAM cache 130 includes the plurality of DRAM devices 132 to 137 connected to DQ lines of the data bus 170. Each of the DRAM devices 132 to 137 may be connected to four data lines (×4) and a data strobe line DQS. For example, a given DQ line connected to a given DRAM device (e.g., 132) may include four data lines and a data strobe line DQS. Each of the DRAM devices 132 to 137 may be controlled by the cache controller 131. Each of the DRAM devices 132 to 137 may store a control signal (or control data), addresses CA1 and CA2, and data provided from the cache controller 131 in a memory cell. In an embodiment, at least one of the DRAM devices 132 to 137 stores dirty flags about cache lines or cache units constituting a cache line, based on a control of the cache controller 131. At least one of the DRAM devices 132 to 137 may include dirty cells that store the above-described dirty flags respectively and a sense amplifier that writes data into the dirty cell and senses the written data. Alternatively, one of the DRAM devices 132 to 137 may be used as a dedicated device that stores only the dirty flags. An embodiment of a DRAM device that stores the dirty flags will be described in more detail below.

The cache controller 131 may update and manage the dirty flags based on a command/address (e.g., CMD/ADD) provided from the host 110. When a specific unit in a cache line is updated, the cache controller 131 may update a dirty flag to have a dirty state. In addition, when access to cache lines or a dirty flag is requested from the host 110, the cache controller 131 may control the DRAM devices 132 to 137 such that the dirty flag is provided to the host 110.

While FIG. 2 illustrates a specific configuration of the DRAM cache 130, the DRAM cache 130 is not limited thereto. In an embodiment, even though not shown in FIG. 2, the DRAM cache 130 may have a form of a dual in-line memory module (DIMM) and may be mounted on a DIMM socket electrically or directly connected to the host 110. In addition, each of the DRAM devices 132 to 137 in the DRAM cache 130 may be connected with the memory bus 170 through a data buffer DB (not shown).

Figure 3:
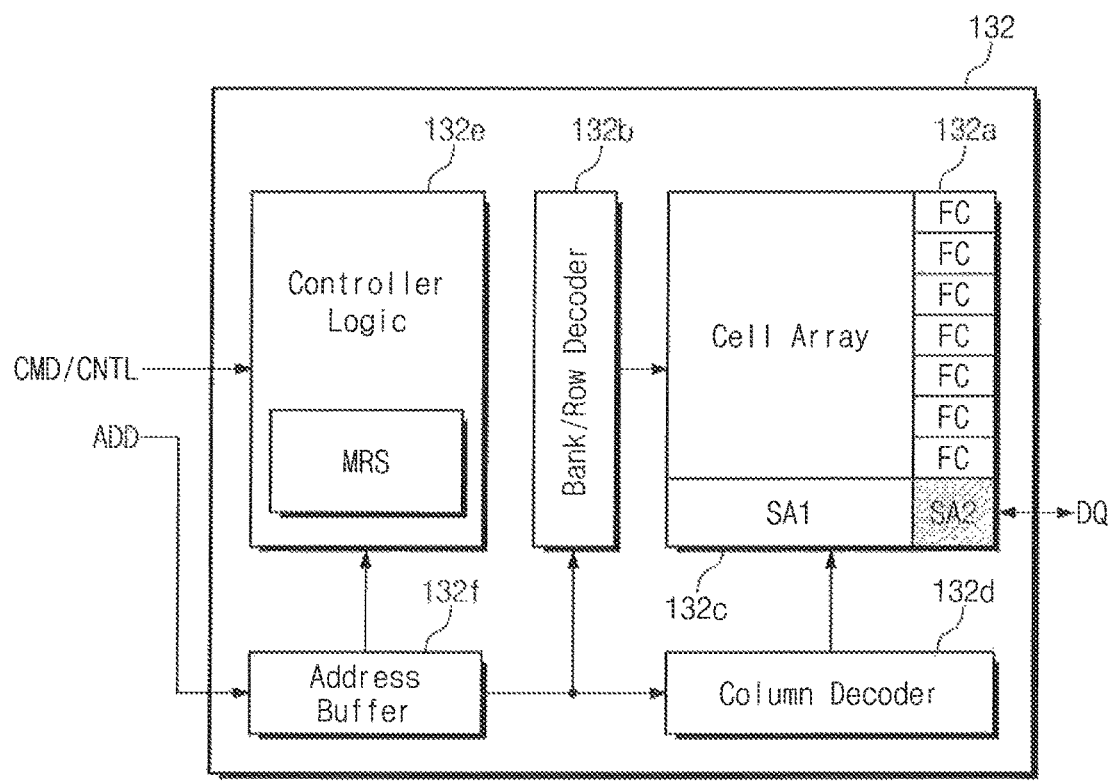
FIG. 3 is a block diagram illustrating a DRAM device of FIG. 2 according to an exemplary embodiment of the inventive concept.

FIG. 3 is a block diagram illustrating the DRAM device 132 of FIG. 2 according to an exemplary embodiment of the inventive concept. Referring to FIG. 3, the DRAM device 132 according to an embodiment of the inventive concept includes a cell array 132*a*, a bank/row decoder 132*b*, a bit line sense amplifier 132*c*, a column decoder 132*d*, control logic 132*e*, and an address buffer 132*f*.

The cell array 132a may include a plurality of memory cells that are connected to word lines and bit lines and are arranged along a row direction and a column direction. In an embodiment, each of the memory cells includes a cell capacitor and an access transistor, where a gate of the access transistor is connected to one of the word lines arranged in the row direction. In an embodiment, one end of the access transistor is connected to a bit line or complementary bit line arranged in the column direction, and the other end of the access transistor is coupled to the cell capacitor. The cell array 132a includes flag cells (hereinafter referred to as "FCs") that store dirty flags, respectively. A dirty flag corresponding to each of the cache units may be stored in each of the flag cells FC.

The bank/row decoder 132b may select a word line of a memory cell to be accessed in response to an input address ADD. The bank/row decoder 132b may decode the input address ADD and may enable the selected word line based on the decoded input address ADD. In addition, in a self-refresh operation mode, the bank/row decoder 132b may decode a row address generated from an address counter (not shown) and may enable a corresponding word line based on the decoded row address. The column decoder 132d may select a bit line of a memory cell in which data is to be stored into or to be outputted from.

The bit line sense amplifier 132c may write data into a selected memory cell through a selected bit line or may sense (e.g., read) the written data. The bit line sense amplifier 132c may sense data stored in the selected memory cell through the selected bit line and may provide the sensed data to an input/output terminal. In addition, the bit line sense amplifier 132c may further include elements that store data received from the input/output terminal in the selected memory cell. Alternatively, the bit line sense amplifier 132c may re-write the data stored in the memory cell in a self-refresh mode. In addition, the bit line sense amplifier 132c may include a first sense amplifier SA1 that accesses a region in which cache data is stored and a second sense amplifier SA2 that writes information, indicating whether a dirty state (e.g., logical 0 or 1) of a corresponding cache unit is written, in a flag cell FC. For example, the second sense amplifier SA2 may set a dirty flag associated with a given cache unit to a logical 1 when data of the given cache unit does not match corresponding data in the main memory 150 and set the dirty flag to a logical 0 when the data is initially written to both the main memory 150 and the cache unit.

The control logic 132e may control an internal operation of the DRAM device 132 in response to a command CMD, a control signal CNTL, or an address. The control logic 132e may adjust, for example, a delay of a clock signal provided from an external device, or may decode the command CMD, the control signal CNTL, of the address. For example, the command CMD may be a read or a write command. For example, the control signal CNTL may be a row address strobe /RAS or a column address strobe /CAS. In particular, the control logic 132e according to an embodiment of the inventive concept selects an operation mode based on information provided through a memory command/address (MCA) or a control signal. In an embodiment, the control logic 132e determines whether the operation mode corresponds to a backup operation, a restore operation, or a normal operation and controls a multiplexer (not shown) based on the determined result. To this end, the control logic 132e may include a mode register set MRS.

The address buffer 132f may temporarily store the address received from an external device. The address buffer 132f may provide the stored address ADD to the bank/row decoder 132b or the column decoder 132d. An address of an external signaling manner may be converted into an address ADD of an internal signaling manner by the address buffer 132f.

As described above, the DRAM device 132 according to an embodiment of the inventive concept includes portions for storing data and the flag cells FC and the second sense amplifier SA2 that stores a dirty flag in each flag cell FC and senses the stored dirty flag. However, a structure of the DRAM device 132 described above may only be an embodiment implemented to store dirty flags. That is, one of the DRAM devices 132 to 137 may be used as a dedicated device that stores only the dirty flags. In this case, each of remaining DRAM devices other than one DRAM corresponding to the dedicated device does not include flag cells FC.

Figure 4:
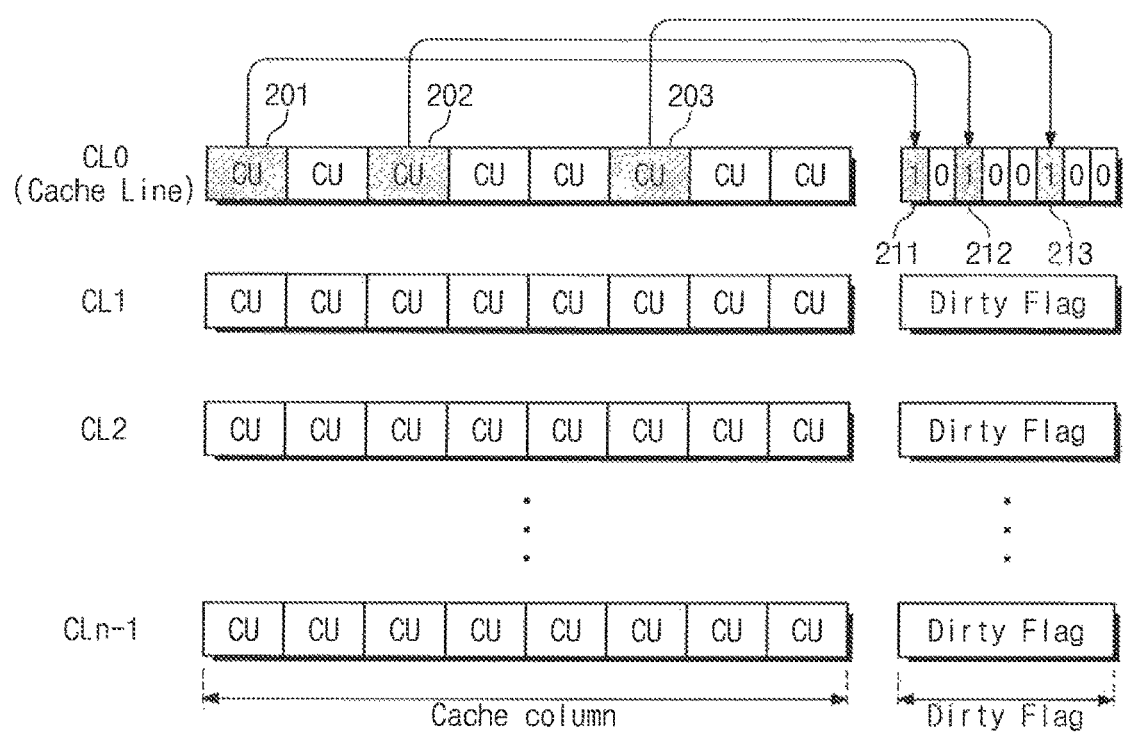
FIG. 4 is a block diagram illustrating a structure of a cache line included in a DRAM cache according to an exemplary embodiment of the inventive concept.

FIG. 4 is a block diagram illustrating a structure of a cache line included in a DRAM cache according to an exemplary embodiment of the inventive concept. Referring to FIG. 4, each of cache lines CL0, CL1, CL2, ..., to CLn−1 that are located within each the DRAM devices 132 to 137 includes a cache column and a dirty flag field. The cache column includes cache units CU each corresponding to an input/output unit (e.g., a unit of data to input or output) of the DRAM cache 130. The dirty flag may include flag bits indicating an update status of each of the cache units CU.

In an embodiment, a cache unit CU has a size of 64 bytes corresponding to an input/output unit of the DRAM cache 130. Moreover, the dirty flag may indicate an update status (dirty or clean) of each of the cache units CU constituting a cache column. As discussed above, the size of each cache unit CU may be 64 bytes. When data stored in the main memory 150 is cached to the cache column of the cache line CL0 for the first time, a dirty flag field of the cache line CL0 may be set to have bits of "00000000" indicating, for example, a clean state.

Afterwards, when a cache unit 201 of the cache line CL0 is updated, a dirty flag bit 211 indicating a dirty state of the cache unit 201 may be set to a logical "1", for example, the dirty state. The dirty flag may be set by the cache controller 131 of the DRAM cache 130. Moreover, when a cache unit 202 of the cache line CL0 is updated, a dirty flag 212 indicating a dirty state of the cache unit 202 may be set to logical "1", i.e., the dirty state. In addition, when a cache unit 203 of the cache line CL0 is updated, a dirty flag 213 indicating a dirty state of the cache unit 203 may be set to logical "1", i.e., the dirty state. Here, cache units 201, 202, and 203 may be updated while a memory region in the main memory 150 corresponding to each of the cache lines is not updated. Accordingly, an update status of each of the cache units 201, 202, and 203 may be set to the dirty state. As described above, a dirty flag of the cache line CL0 that is read under the above-described condition may have a value of "10100100". In this case, the host 110 may recognize that the cache units 201, 202, and 203 of the cache line CL0 are in the dirty state and the other cache units of the cache line CL0 are in the clean state.

The Update of the cache lines CL0 to CLn−1 and the setting of the dirty flags may be performed according to the above-described manner. As described above, a dirty flag may be updated and managed based on an address provided to the DRAM cache 130 under a control of the cache controller 131.

Figure 5:
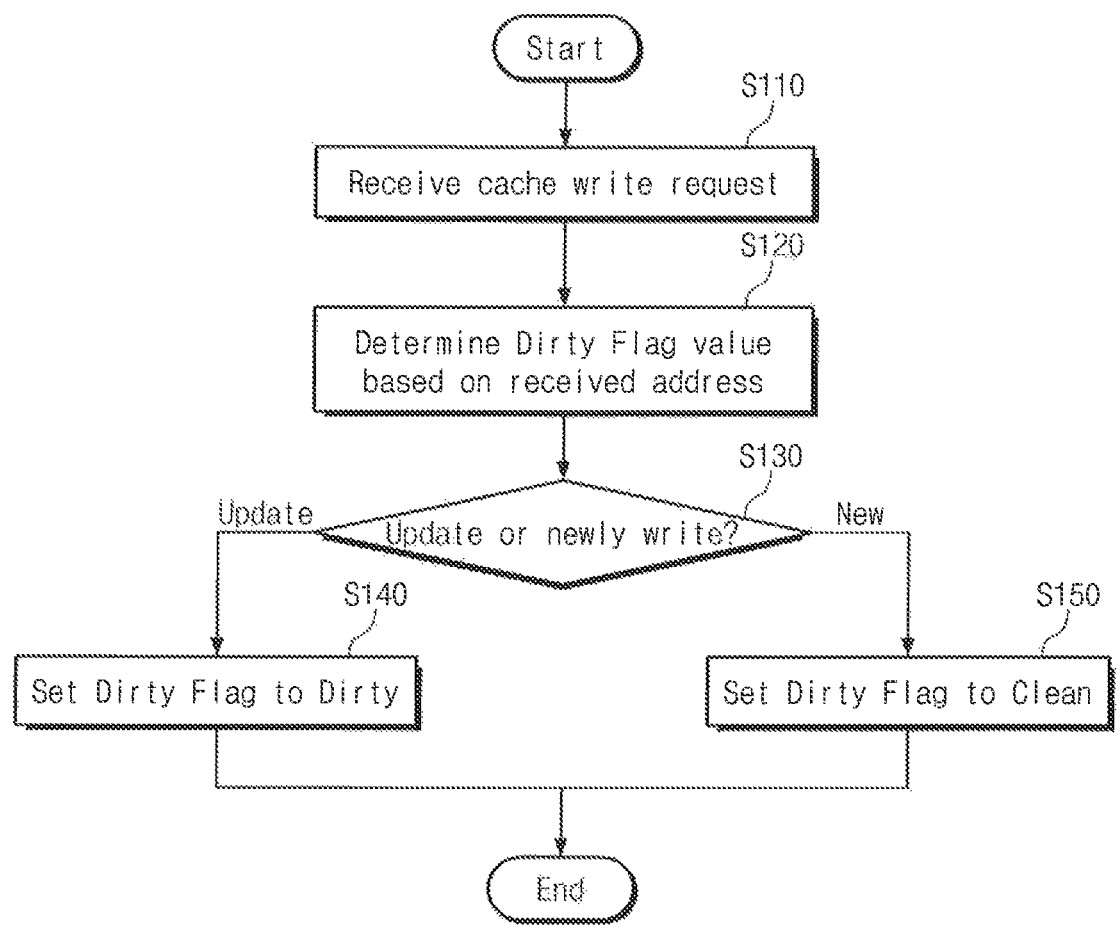
FIG. 5 is a flow chart illustrating an operation method of a cache controller of a DRAM cache managing a dirty flag according to an exemplary embodiment of the inventive concept.

FIG. 5 is a flow chart illustrating an operation method of the cache controller 131 of the DRAM cache 130 managing a dirty flag according to an exemplary embodiment of the inventive concept. Referring to FIG. 5, the cache controller

131 may update the cache column and dirty flag of each of the cache lines in response to a cache write request from the host 110.

In step S110, the DRAM cache 130 receives the cache write request from the host 110. Before issuing the cache write request, the host 110 may determine whether data to be written into the main memory 150 is stored in the DRAM cache 130. That is, the host 110 may determine whether a cache hit occurs. In the case where a cache hit occurs, the host 110 may send the cache write request to the DRAM cache 130. In this case, the cache controller 131 may receive the cache write request provided from the host 110.

In step S120, the cache controller 131 determines a location and a value of a cache line CL, a cache unit CU, and a dirty flag, based on an address provided from the cache write request. The cache controller 131 may write data into a cache unit, which corresponds to the provided address, from among cache units CU included in a selected cache line.

In step S130, in the selected cache line, the cache controller 131 writes a value of the dirty flag based on a state of the cache unit CU. In the case where data written into the cache unit CU is the same as data stored in the main memory 150 (cache hit) and in the case where the data in the cache unit CU is updated before data in the main memory 150 is updated (update), the process proceeds to step S140. In contrast, in the case where the data in the cache unit has not already been flushed to the main memory 150 (new), the process proceeds to step S150. For example, when data within the main memory 150 is first accessed, it can be stored in a cache unit with a dirty flag set to a clean state. If that data is then updated only within the cache unit, its dirty flag would then be set to a dirty state.

In step S140, the cache controller 131 sets a state of a dirty flag corresponding to the updated cache unit to a dirty state. For example, as described above, the cache controller 131 may write a logical "1" into a flag cell FC storing the dirty flag corresponding to the updated cache unit. When dirty flags are completely set, an operation of setting dirty flags of write requested cache units may be terminated.

In step S150, the cache controller 131 sets a state of a dirty flag corresponding to a write requested cache unit to a clean state. For example, the cache controller 131 may write a logical "0" into a flag cell FC corresponding to a cache unit CU in which data is written before the data is written in the main memory 150. When dirty flags are completely set, an operation of setting the dirty flags of the write requested cache units may be terminated.

While the above describes a method of setting dirty flags when a write operation to a single cache unit is requested, the inventive concept is not limited thereto. For example, the dirty flags may be set in synchronization with the update of 2 or more cache units.

Figure 6:
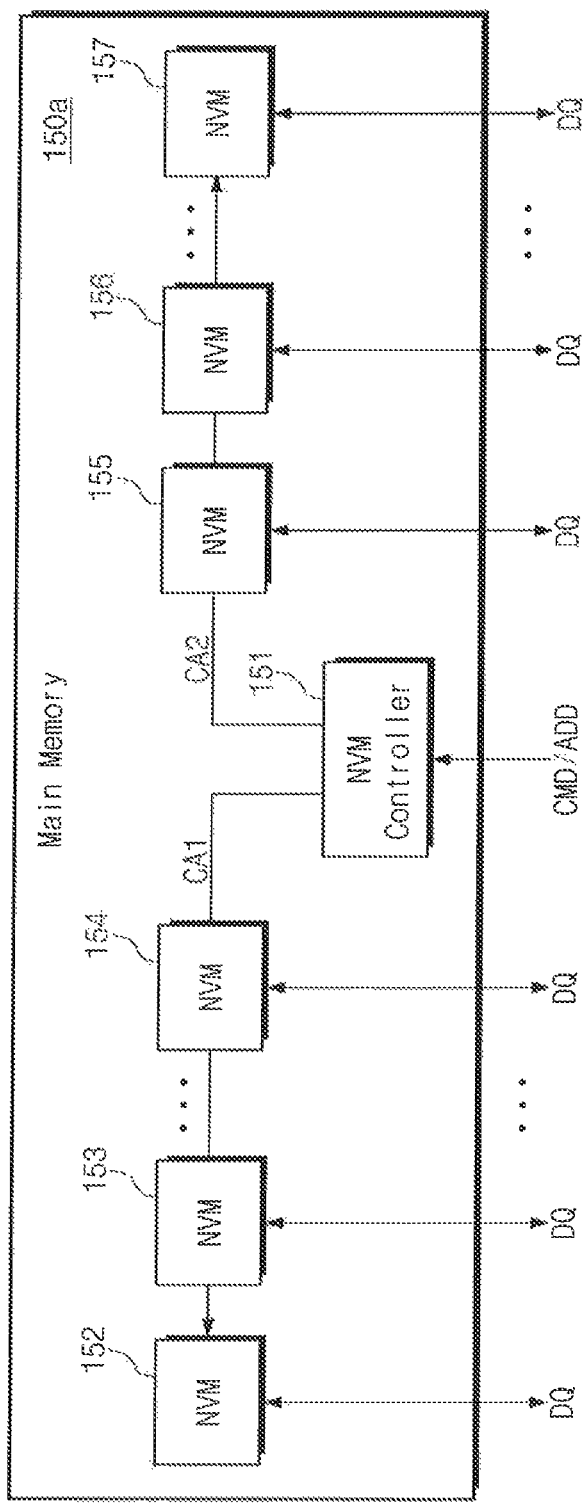
FIG. 6 is a block diagram illustrating a main memory according to an exemplary embodiment of the inventive concept.

FIG. 6 is a block diagram illustrating a configuration of a main memory according to an exemplary embodiment of the inventive concept. Referring to FIG. 6, a main memory 150*a* includes an NVM controller 151 and a plurality of nonvolatile memory devices 152 to 157.

The plurality of nonvolatile memory devices 152 to 157 may be connected to the DQ lines of the memory bus 170 (refer to FIG. 1), respectively. For example, the nonvolatile memory device 152 may be connected directly to four data lines (×4). In addition, data may be inputted or outputted to or from the nonvolatile memory device 152 through a DQS line allocated to four data lines. In addition, the remaining nonvolatile memory devices 153 to 157 may be connected to different DQ lines. The memory controller 115 of the host 110 may provide data to the nonvolatile memory devices 152 to 157 through the memory bus 170 and may send a command or an address to the NVM controller 151.

The NVM controller 151 may receive a command/address CMD/ADD supplied from the memory controller 115 of the host 110. The NVM controller 151 may send the received command/address CMD/ADD to the nonvolatile memory devices 152 to 157. Under control of the NVM controller 151, the nonvolatile memory devices 152 to 157 may receive data, of which the input/output size is different from that of the DRAM cache 130. For example, data may be provided to the main memory 150*a* in the form of a packet having a size greater than that of data sent to the DRAM cache 130. In addition, when outputting data, each of the nonvolatile memory devices 152 to 157 may output the data in the form of the packet. The NVM controller 151 may buffer a command/address CMD/ADD that is provided from the host 110 to store data of the packet form in a cell region and may send the buffered command/address CMD/ADD to the nonvolatile memory devices 152 to 157.

Although not shown in FIG. 6, the main memory 150*a* may further include a plurality of DRAM devices that constitute a level different from a level that the nonvolatile memory devices 152 to 157 constitute. For example, Alternatively, the main memory 150*a* may further include volatile memory devices used as buffers of the nonvolatile memory devices 152 to 157. The main memory 150*a* may include DRAM devices and nonvolatile memory devices used for backup. In addition, the main memory 150*a* may be implemented such that the DQ lines are connected to the NVM controller 151 and data from the NVM controller 151 is sent to the nonvolatile memory devices 152 to 157.

The nonvolatile memory devices 152 to 157 may be implemented with, for example, one or more flash memories. Alternatively, the nonvolatile memory devices 152 to 157 may be implemented with various nonvolatile memory devices such as an electrically erasable and programmable ROM (EEPROM), a NAND flash memory, NOR flash memory, a phase-change RAM (PRAM), a resistive RAM (ReRAM), a ferroelectric RAM (FRAM), and a spin transfer torque magnetic RAM (STT-MRAM).

Figure 7:
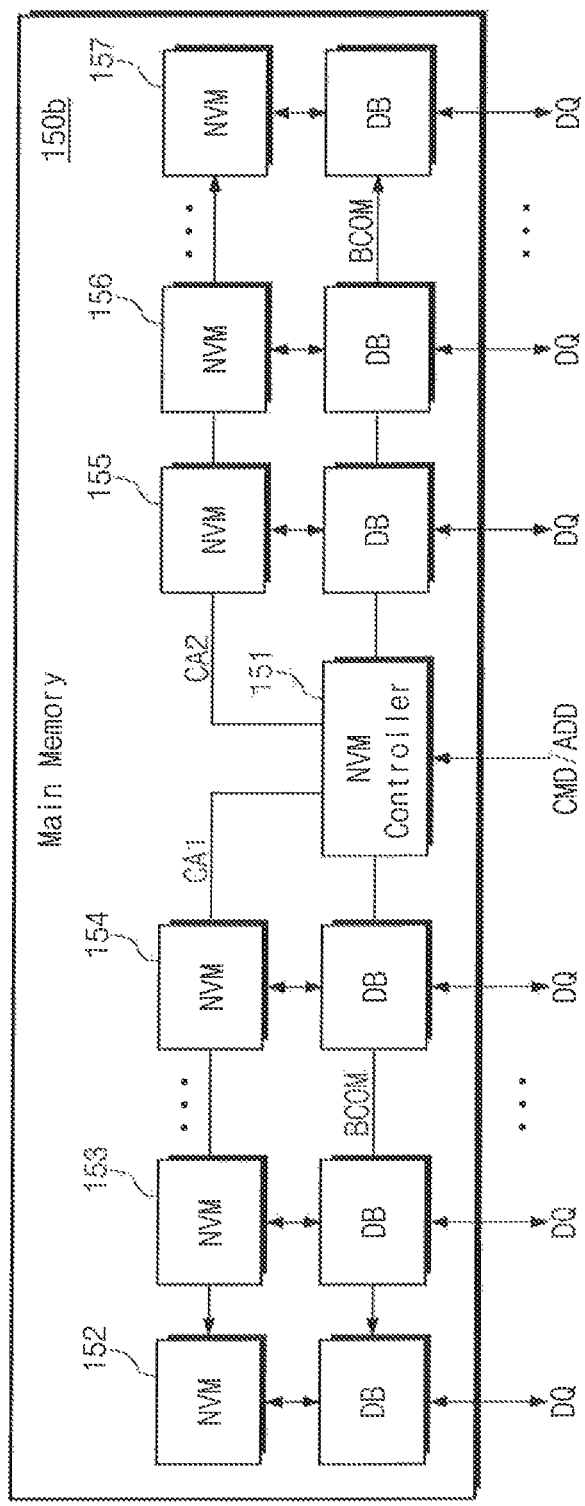
FIG. 7 is a block diagram illustrating a main memory according to an exemplary embodiment of the inventive concept.

FIG. 7 is a block diagram illustrating a main memory according to an exemplary embodiment of the inventive concept. Referring to FIG. 7, a main memory 150*b* includes an NVM controller 151, a plurality of nonvolatile memory devices 152 to 157, and a plurality of data buffers DB.

Data to be provided to the plurality of nonvolatile memory devices 152 to 157 may be sent through the data buffers DB corresponding to the nonvolatile memory devices 152 to 157, respectively. In addition, data outputted from the plurality of nonvolatile memory devices 152 to 157 may be sent to the memory bus 170 (refer to FIG. 1) through the data buffers DB corresponding to the nonvolatile memory devices 152 to 157, respectively.

The data buffers DB may receive data and a data strobe signal from the host 110 and may send the received data and data strobe signal to the nonvolatile memory devices 152 to 157. In general, the main memory 150*b* may have, for example, a structure compatible with a load reduced DIMM (LRDIMM) based on existence of the data buffers DB. The data buffers DBs may be controlled according to a buffer command BCOM provided from the NVM controller 151. That is, delays or levels of the data and the data strobe signal may be controlled according to the buffer command BCOM. A buffer command COM may be sent from the NVM controller 151 to a given data buffer through another data buffer.

The NVM controller 151 may receive the command/address CMD/ADD that the memory controller 115 of the host 110 provides and may send the received command/address CMD/ADD to the nonvolatile memory devices 152 to 157. Under control of the NVM controller 151, the data buffers DB may receive the data, of which the input/output size is different from an input/output size of the DRAM cache 130, and a data strobe signal. For example, the data may be provided to the main memory 150*b* in the form of a packet having a size greater than that of data sent to the DRAM cache 130. In addition, when outputting the data, each of the nonvolatile memory devices 152 to 157 may output the data in the form of the packet. The NVM controller 151 may buffer the command/address CMD/ADD that is provided from the host 110 to store data of the packet form in a cell region and may send the buffered command and address to the nonvolatile memory devices 152 to 157.

A configuration of the main memory 150*b* according to an embodiment of the inventive concept is described with reference to FIGS. 6 and 7. However, the configuration and function of the main memory 150 according to an embodiment of the inventive concept is not limited thereto. The main memory 150*b* may include a memory module or memory storage device that has a data input/output size different from that of the DRAM cache 130 or may include both the memory module and the memory storage device each of which has a data input/output size different from that of the DRAM cache 130.

Figure 8:
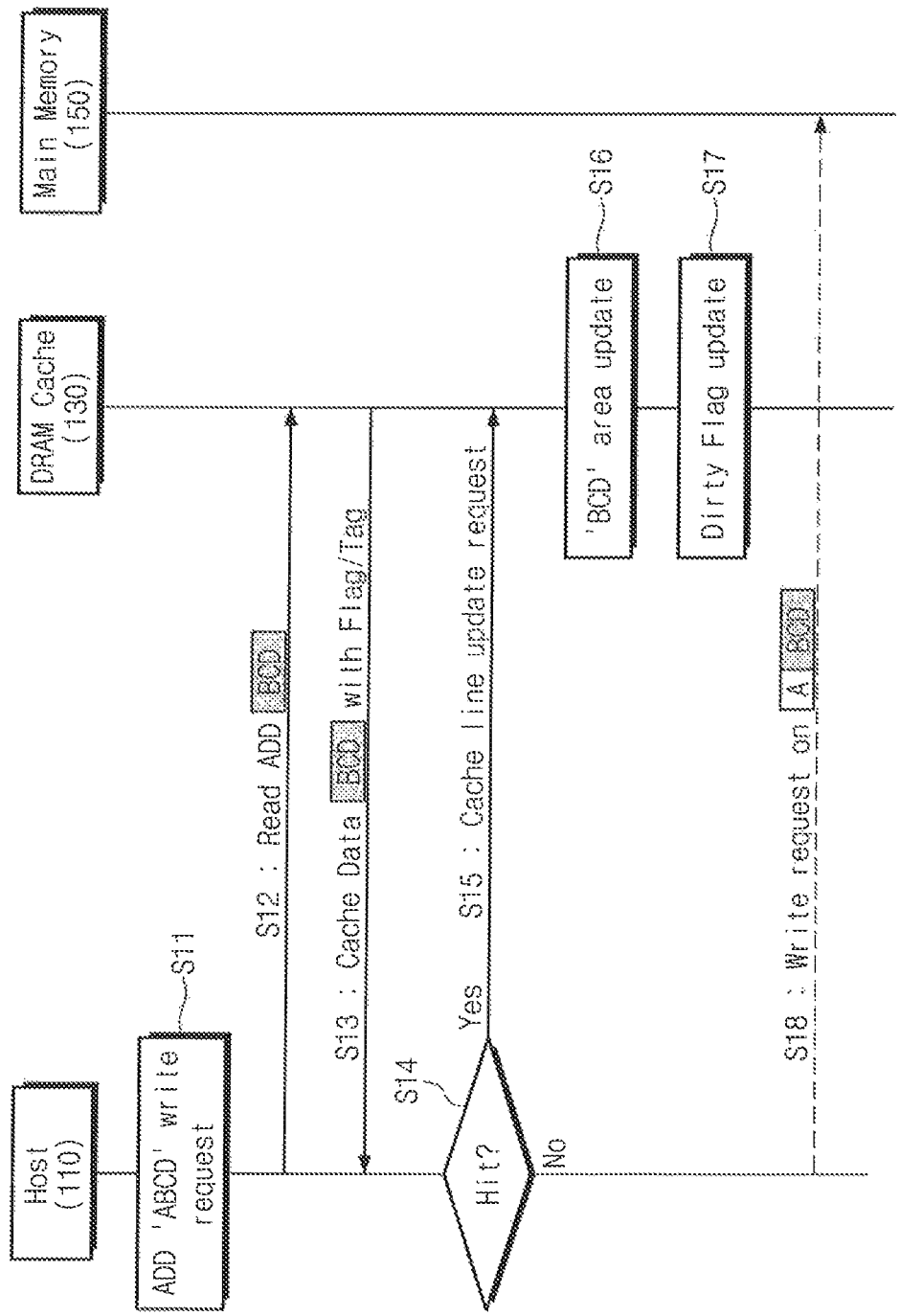
FIG. 8 is a diagram illustrating a cache line update method of a memory system according to an exemplary embodiment of the inventive concept.

FIG. 8 is a diagram illustrating a cache line update method of a memory system according to an exemplary embodiment of the inventive concept. Referring to FIG. 8, the memory system 100 (refer to FIG. 1) according to an embodiment of the inventive concept updates a dirty flag while updating a cache line.

In step S11, it is assumed that a data write to a region of the main memory 150 corresponding to an address of "ABCD" is requested from the host 110. In this case, the host 110 may request the memory controller 115 to write data in the region corresponding to the address of "ABCD". Below, an operation of the memory controller 115 may be described in a category of host 110.

In step S12, the host 110 determines whether write-requested data is cached in the DRAM cache 130. That is, the host 110 attempts to access the DRAM cache 130 to determine whether the write-requested data is the same as data written into the cache unit CU (cache hit). The host 110 may send a read request about a cache line corresponding to an address of "BCD" of the main memory 150 to the DRAM cache 130.

In step S13, the DRAM cache 130 senses data of the cache line corresponding to the address "BCD" provided from the host 110 and outputs the sensed data. In this case, a dirty flag according to an embodiment of the inventive concept may be also outputted together with data of the cache line. In an embodiment, the data of the cache line thus outputted may include tag information. That is, when data cached in the cache line is mapped between the DRAM cache 130 and the main memory 150 at a ratio of 1:N, the tag information may correspond to an address of the main memory 150 corresponding to the cache line. For example, the address of "BCD" of the DRAM cache 130 may be mapped to an address (e.g., "ABDC", "EBCD", or "FBCD") of the main memory 150. The tag information included in the cache line may be used to determine whether the write-requested data is the same as data written in the DRAM cache 130 (hereinafter referred to as "cache hit"). The dirty flag according to an embodiment of the inventive concept is not used to determine whether a cache hit of the write-requested data occurs. Accordingly, in an operation of determining whether a cache hit of the write-requested occurs, a dirty flag read from the DRAM cache 130 is not considered.

In step S14, the host 110 determines whether a cache hit of the write-requested data occurs, based on the tag information of the cache line read from the DRAM cache 130. The case where the tag information included in the data read from the DRAM cache 130 is "A" may mean the case where data to be updated with the write-requested data is in the cache line. Accordingly, whether a cache hit of the data to update has occurred may be determined by the host 110. In this case, the process proceeds to step S15 in which the host 110 updates the cache line with the write-requested data. In contrast, the case where the tag information included in the data read from the DRAM cache 130 is not "A" but "E" may mean the case where data to be updated with the write-requested data is not in the cache line. Accordingly, the host 110 may determine that a cache miss of the write-requested data occurs. In this case, the host 110 performs step S18 in which the write-requested data is stored in the main memory 150.

In step S15, the host 110 updates the cache line by using the write-requested data. The host 110 may request the DRAM cache 130 to write the write-requested data into a cache line or a cache unit corresponding to the address of "BCD" of the DRAM cache 130.

In step S16, the DRAM cache 130 writes the write-requested data into a corresponding cache line or cache unit in response to a request from the host 110.

In step S17, the DRAM cache 130 updates dirty flags corresponding to cache units of the updated cache line, respectively. That is, when some of the cache units included in a cache line are updated, the cache controller 131 of the DRAM cache 130 updates dirty flags corresponding to only the updated cache units, respectively. Here, even though steps S16 and S17 are separately described, in an embodiment of the inventive concept, steps S16 and step S17 are executed at the same time.

In step S18, the host 110 requests the main memory 150 to write the write-requested data, which is not in the DRAM cache 130, into a region corresponding to an address of "ABCD" of the main memory 150.

As described above, an embodiment of the inventive concept provides a method of updating data in the DRAM cache 130 and setting a value of a dirty flag to a corresponding value.

Figure 9:
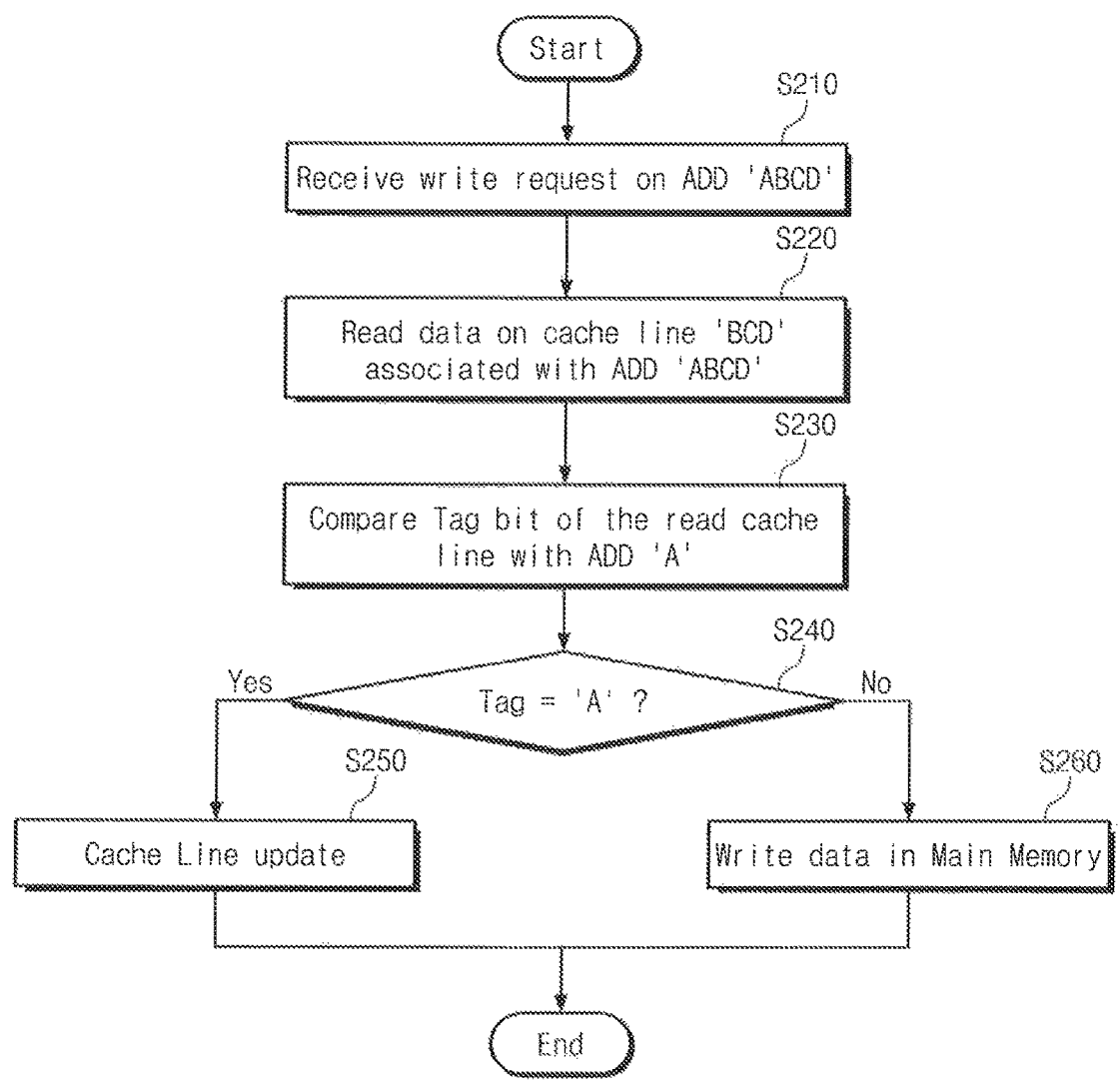
FIG. 9 is a flow chart illustrating a cache update method of a memory controller included in a host according to an exemplary embodiment of the inventive concept.

FIG. 9 is a flow chart illustrating a cache update method of the memory controller 115 included in a host according to an exemplary embodiment of the inventive concept. Referring to FIG. 9, when a write request is generated, the memory controller 115 may access the DRAM cache 130 to determine whether a cache hit/miss of write-requested data occurs.

In step S210, the memory controller 115 receives a write request to the main memory 150 from a processor (e.g., a CPU) of the host 110. For example, the write request which the memory controller 115 receives may be associated with data corresponding to the address of "ABCD" of the main memory 150. Here, an address "A" may be stored as tag information in the DRAM cache 130.

In step S220, the memory controller 115 accesses the DRAM cache 130 to determine whether the write-requested data is in the DRAM cache 130. The memory controller 115 may read a cache region of the DRAM cache 130 corresponding to a cache address of "BCD" of the write-requested data. Here, the cache region corresponding to the cache address of "BCD" may be a cache line or cache unit. In addition, the cache region corresponding to the cache address of "BCD" may include tag information. In addition, a dirty flag of the cache region corresponding to the cache address of "BCD" may also be sent to the memory controller 115.

In step S230, the memory controller 115 compares the address of "A" of the write-requested data with the tag information read from the DRAM cache 130.

In step S240, the memory controller 115 performs a branch operation based on the comparison result. The case where the tag information read from the DRAM cache 130 is the same as the address of "A" means the data corresponding to the cache address of "BCD" of the DRAM cache 130 is updated with the write-requested data. Accordingly, the process proceeds to step S250. In contrast, when the tag information read from the DRAM cache 130 is not the same as the address of "A", the data corresponding to the cache address of "BCD" of the DRAM cache 130 is data that is not associated with the write-requested data. In this case, the processor determines that a cache miss occurs, and thus proceeds to step S260.

In step S250, the memory controller 115 requests the DRAM cache 130 to update the write-requested data. In this case, the cache controller 131 of the DRAM cache 130 may store the write-requested data in a cache line and may set a state of a dirty flag to a dirty state.

In step S260, the memory controller 115 writes the write-requested data in the main memory 150. When the data written in the main memory 150 satisfies a cache condition (e.g., a point in time when data such as metadata or data to be frequently written is written in the cache memory after the write-requested data is completely updated in the cache region), the data written in the main memory 150 may be loaded to the DRAM cache 130.

As described above, at least one embodiment of the inventive concept provides a cache hit or miss determination method and a cache update method.

Figure 10:
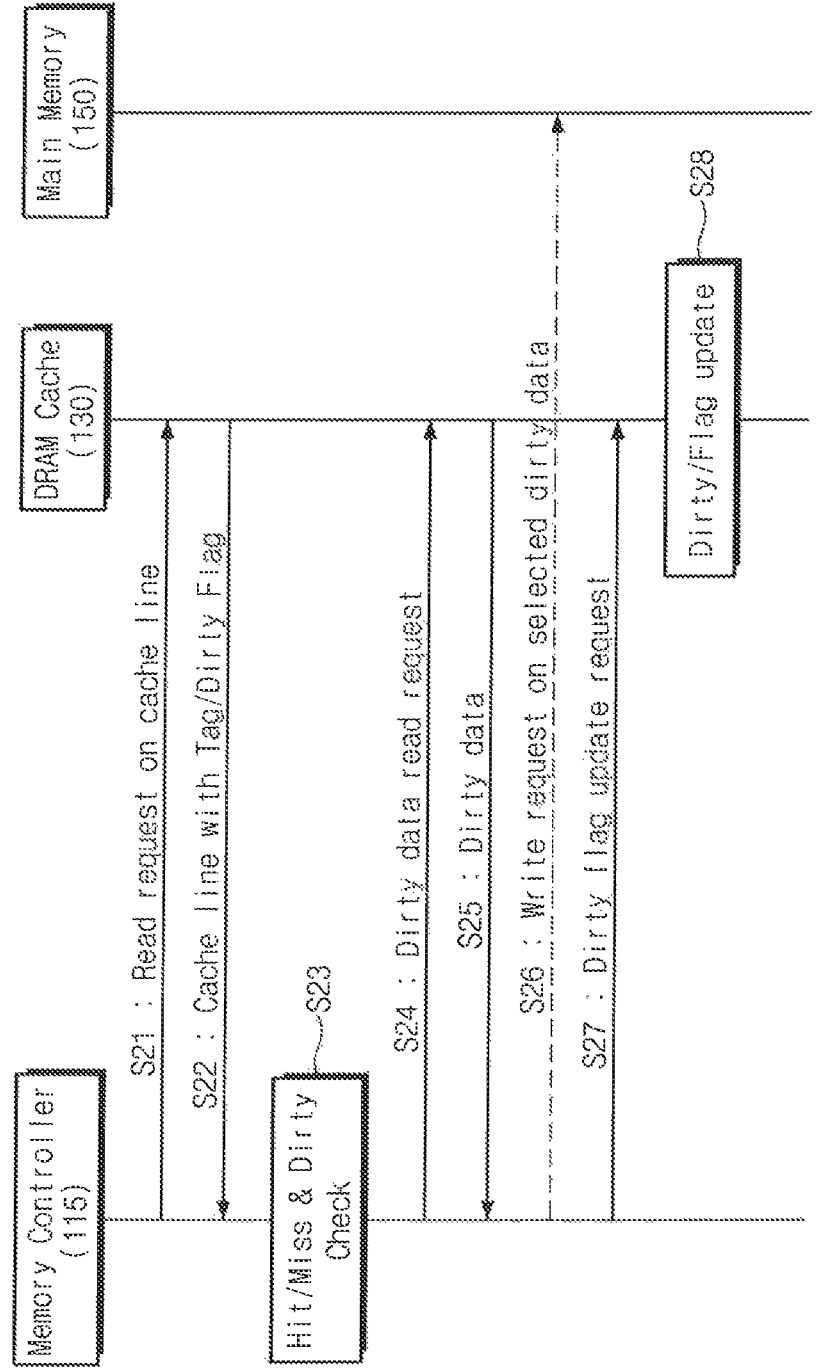
FIG. 10 is a diagram illustrating a method of synchronizing a dirty line in a DRAM cache according to an exemplary embodiment of the inventive concept.

FIG. 10 is a diagram illustrating a method of synchronizing a dirty line in a DRAM cache according to an exemplary embodiment of the inventive concept. Referring to FIG. 10, the memory controller 115 selects only updated dirty data based on dirty flags stored in the DRAM cache 130 and flushes the selected dirty data to the main memory 150. In this case, data may be flushed in units of cache units each of which has a size smaller than a cache line. Accordingly, an occupancy rate of the data bus 170 (refer to FIG. 1) for synchronization between the DRAM cache 130 and the main memory 150 may decrease.

In step S21, the memory controller 115 accesses the cache lines of the DRAM cache 130 for dirty line synchronization. The dirty line synchronization may be periodically performed according to a status of the DRAM cache 130. When a dirty line synchronization request is generated, the memory controller 115 may send a read request for the cache lines to the DRAM cache 130.

In step S22, the DRAM cache 130 transmits data corresponding to the requested cache lines to the memory controller 115 in units having a size of an input/output unit. In this case, a dirty flag corresponding to each of the cache lines may be transmitted together with the data. Also, tag information stored in each of the cache lines may be transmitted together with the data.

In step S23, the memory controller 115 detects whether a cache hit related to the main memory 150 occurs, based on the tag information of each of the cache lines provided from the DRAM cache 130. Whether a cache hit/miss of a data unit such as a page of the main memory mapped to a cache line occurs may be determined based on the tag information.

In addition, the memory controller 115 may determine whether cache units of each of the cache lines determined as the cache hit are dirty. That is, the memory controller 115 may check a dirty/clean state based on a dirty flag corresponding to each of the cache units CU.

In step S24, the memory controller 115 sends a read request to the DRAM cache 130 for the cache units CU, which are determined as having a dirty state. A dirty state of each cache unit smaller in size than the cache line may be determined according to the dirty flag. As such, to update the dirty line, the memory controller 115 may request from the DRAM cache 130 only cache units, each of which has the dirty state.

In step S25, the DRAM cache 130 reads the read-requested cache units of the dirty state and provides the read data to the memory controller 115.

In step S26, the memory controller 115 writes data of the cache units of the dirty state provided from the DRAM cache 130 in the main memory 150. The memory controller 115 may send the write request to the main memory 150 such that the data of the cache units loaded from the DRAM cache 130 is written. In FIG. 10, a dotted line indicates data exchange between the memory controller 115 and the main memory 150. The main memory 150 may be updated in response to a write request about dirty data. When implemented with an over-writable memory device, the main memory 150 may overwrite data about cache units of the dirty state in corresponding regions. In contrast, when implemented with a memory incapable of being overwritten, the main memory 150 may update dirty data by using a manner such as an address mapping manner.

In step S27, when receiving complete information (or information in which the dirty data is completely updated) of the main memory 150, the memory controller 115 requests the DRAM cache 130 to update the dirty flag. That is, the memory controller 115 may request the DRAM cache 130 to set a dirty state of each dirty flag to a clean state (dirty flag update).

In step S28, the cache controller 131 of the DRAM cache 130 may set a state of each dirty flag to the clean state in response to an update request of the dirty flag.

As discussed above, a dirty line synchronization method of the memory controller 115 according to an embodiment of the inventive concept is described. Only cache units each of which has the dirty state and which are included in a cache line may be flushed to the main memory 150 based on the dirty flags according to an embodiment of the inventive concept. Accordingly, when the cache units of the dirty state are flushed by the cache line, the memory bus 170 may be used efficiently.

Figure 11:
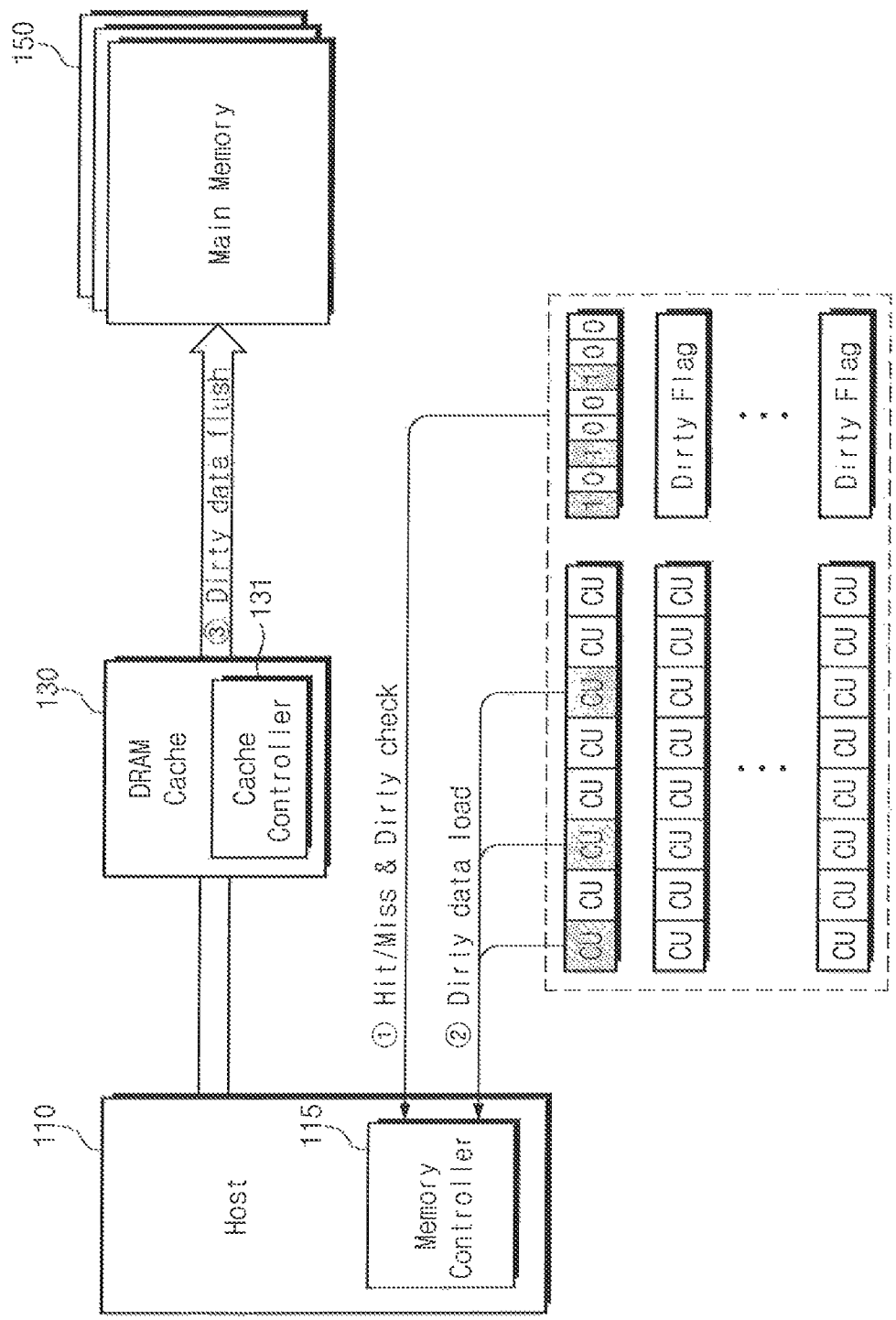
FIG. 11 is a block diagram visually illustrating a dirty line synchronization method according to an exemplary embodiment of the inventive concept.

FIG. 11 is a block diagram visually illustrating a dirty line synchronization method according to an exemplary embodiment of the inventive concept. Referring to FIG. 11, the memory controller 115 flushes only a cache unit CU of a dirty state to the main memory 150 based on a dirty flag. In an embodiment, the cache unit CU is a memory unit which is smaller than an entire cache line unit.

For the dirty line synchronization, the memory controller 115 accesses the cache lines of the DRAM cache 130 (①). The memory controller 115 may synchronize the dirty line of the DRAM cache 130 with the main memory 150 periodically or based on a status of the DRAM cache 130. In this case, when the synchronization time point of the dirty line occurs, the memory controller 115 accesses the cache lines of the DRAM cache 130. In this case, a dirty flag corresponding to each of the read cache lines may be also provided to the memory controller 115. The memory controller 115 may determine whether a cache hit/miss occurs, based on tag information included in the read cache lines. In addition, when it is determined that the cache lines are a cache-hit, the memory controller 115 may detect a cache unit of a dirty state based on a dirty flag of a corresponding cache line.

When the cache hit/miss and the dirty state are completely determined, the memory controller 115 re-requests only cache units of the dirty state from the DRAM cache 130 (②). The memory controller 115 may selectively read only cache units each corresponding to a logical "1", i.e., the dirty state.

Afterwards, the memory controller 115 writes data, which is read from the detected cache units CU of the dirty state, in the main memory 150 (③).

For the dirty line synchronization, data may be sent to the main memory 150 in units of cache units each having a size smaller than the cache line. According to the cache line synchronization method, it may be possible to prevent the utilization rate of the memory bus 170 from excessively increasing due to the cache line synchronization.

Figure 12:
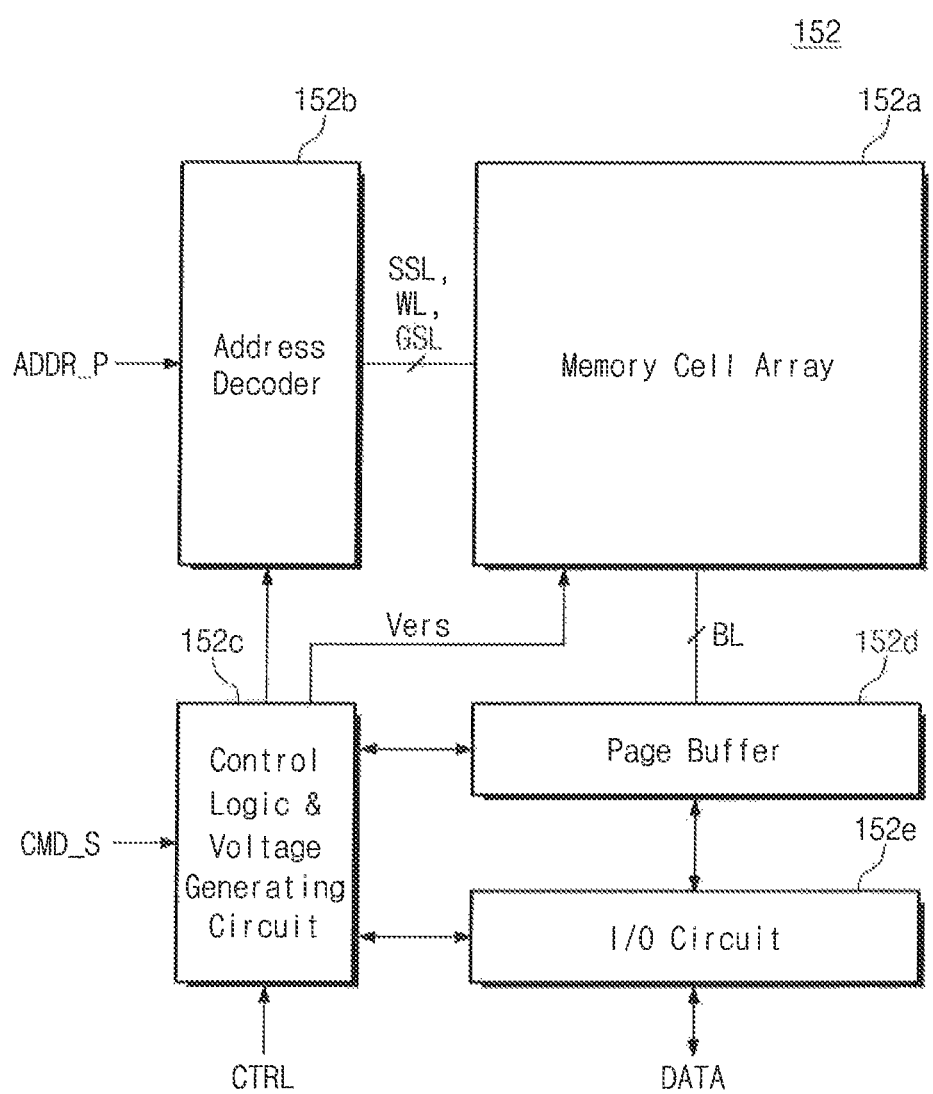
FIG. 12 is a block diagram illustrating a nonvolatile memory described in FIG. 6 or 7.

FIG. 12 is a block diagram illustrating a nonvolatile memory described in FIG. 6 or 7 according to an exemplary embodiment of the inventive concept. In an embodiment, the nonvolatile memory 152 of FIG. 6 may be described on behalf of a function or a characteristic of each nonvolatile memory. Referring to FIG. 12, the nonvolatile memory device 152 includes a memory cell array 152a, an address decoder 152b, a control logic and voltage generating circuit 152c, a page buffer 152d, and an input/output circuit 152e.

The memory cell array 152a may include a plurality of memory blocks. Each of the memory blocks may include a plurality of cell strings. Each of the cell strings may include a plurality of memory cells. A plurality of memory cells may be connected to a plurality of word lines WL. Each of the memory cells may be a single level cell (SLC) storing one bit or a multi-level cell (MLC) storing at least two bits.

The address decoder 152b may be connected with the memory cell array 152a through the word lines WL, string selection lines SSL, and ground selection lines GSL. The address decoder 152b may receive a physical address ADDR_P from an external device, may decode the received physical address ADDR_P, and may drive the word lines WL based on the decoded address. For example, the address decoder 152b may decode the physical address ADDR_P received from the external device, may select at least one of the word lines based on the decoded address ADDR_P, and may drive the selected word line.

The control logic and voltage generating circuit 152c may receive a command CMD_S and a control signal CTRL from the external device and may control the address decoder 152b, the page buffer 152d, and the input/output circuit 152e in response to the received signals. For example, the control logic and voltage generating circuit 152c may control other elements in response to the signals CMD_S and CTRL such that data is stored in the memory cell array 152a. Alternatively, the control logic and voltage generator circuit 152c may control other elements in response to the signals CMD_S and CTRL such that data stored in the memory cell array 152a is outputted to the external device.

The control logic and voltage generating circuit 152c may generate various voltages Vers needed for the nonvolatile memory device 152 to operate. For example, the control logic and voltage generating circuit 152c may generate a plurality of program voltages, a plurality of pass voltages, a plurality of verification voltages, a plurality of selection read voltages, a plurality of non-selection read voltages, and a plurality of erase voltages. In an embodiment, a selection read voltage is used to determine programming states of memory cells. In an embodiment, a non-selection read voltage is applied to a non-selected memory cell at a voltage level sufficient to turn on the non-selected memory cell. In an embodiment, an erase voltage is used to erase a memory cell. The control logic and voltage generator circuit 152c may provide the generated voltages to the address decoder 152b or to a substrate of the memory cell array 152a.

The page buffer 152d may be connected to the memory cell array 152a through a plurality of bit lines BL. Under control of the control logic and voltage generating circuit 152c, the page buffer 152d may control the bit lines BL such that data provided from the input/output circuit 152e is stored in the memory cell array 152a. Under control of the control logic and voltage generator circuit 152c, the page buffer 152d may read data stored in the memory cell array 124a and may provide the read data to the input/output circuit 152e. For example, the page buffer 152d may receive data from the input/output circuit 152e by the page or may read data from the memory cell array 152a by the page.

The input/output circuit 152e may receive data from the external device and may send the received data to the page buffer 152d. Alternatively, the input/output circuit 152e may receive data from the page buffer 152d and may output the received data to the external device (e.g., a device controller 110). For example, the input/output circuit 152e may exchange data with the external device in synchronization with the control signal CTRL.

Figure 13:
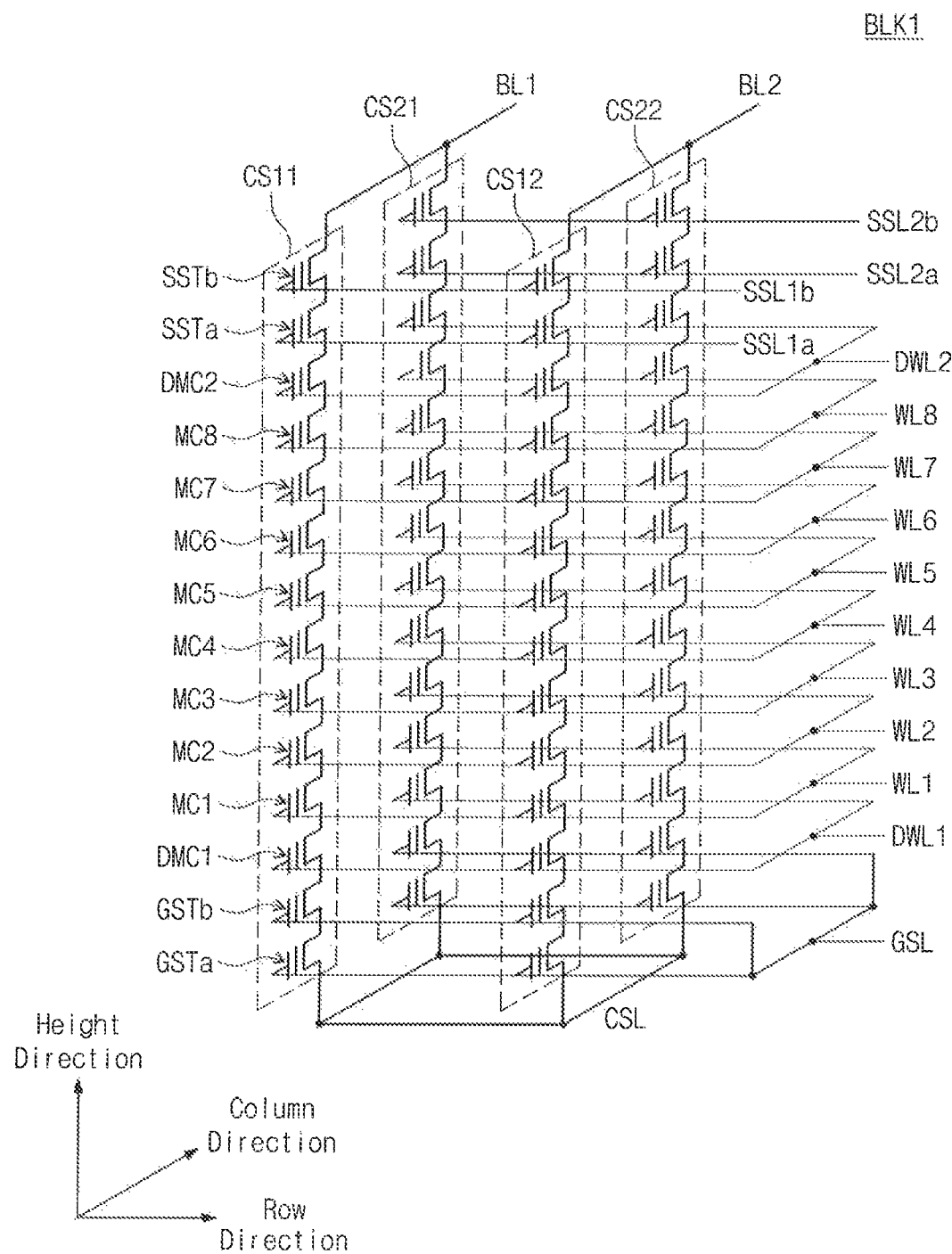
FIG. 13 is a circuit diagram illustrating an embodiment of memory blocks included in a memory cell array in FIG. 12.

FIG. 13 is a circuit diagram illustrating an embodiment of memory blocks included in a memory cell array in FIG. 12. In an embodiment, a first memory block BLK1 having a three-dimensional structure is described with reference to FIG. 13. However, the inventive concept is not limited thereto. For example, other memory blocks included in the nonvolatile memory device 230 may have a structure which is similar to the first memory block BLK1.

Referring to FIG. 13, the first memory block BLK1 includes a plurality of cell strings CS11, CS12, CS21, and CS22. The cell strings CS11, CS12, CS21, and CS22 may be arranged along a row direction and a column direction to form rows and columns.

For example, the cell strings CS11 and CS12 may be connected to string selection lines SSL1a and SSL1b to form a first row. The cell strings CS21 and CS22 may be connected to string selection lines SSL2a and SSL2b to form a second row.

For example, the cell strings CS11 and CS21 may be connected to a first bit line BL1 to constitute a first column. The cell strings CS12 and CS22 may be connected to a second bit line BL2 to constitute a second column.

Each of the cell strings CS11, CS12, CS21, and CS22 may include a plurality of cell transistors. Each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2.

In an embodiment, each of the memory cells included in the cell strings CS11, CS12, CS21, and CS22 is a charge trap flash (CTF) memory cell.

The plurality of memory cells MC1 to MC8 may be serially connected and may be stacked in a height direction being a direction perpendicular to a plane defined by the row direction and the column direction. The string selection transistors SSTa and SSTb may be serially connected and may be disposed between the memory cells MC1 to MC8 and a bit line BL. The ground selection transistors GSTa and GSTb may be serially connected and may be disposed between the memory cells MC1 to MC8 and a common source line CSL.

In an embodiment, a first dummy memory cell DMC1 is disposed between the memory cells MC1 to MC8 and the ground selection transistors GSTa and GSTb. In an embodiment, a second dummy memory cell DMC2 is disposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL.

In an embodiment, ground selection transistors in the same row are connected to the same ground selection line, and ground selection transistors in different rows are connected to different ground selection lines. For example, the first ground selection transistors GSTa of the cell strings CS11 and CS12 in the first row may be connected to the first ground selection line, and the first ground selection transistors GSTa of the cell strings CS21 and CS22 in the second row may be connected to the second ground selection line.

In an embodiment, although not shown, ground selection transistors at the same height from a substrate (not shown) are connected to the same ground selection line, and ground selection transistors at different heights therefrom are connected to different ground selection lines. For example, the first ground selection transistors GSTa of the cell strings CS11, CS12, CS21, and CS22 may be connected to the first ground selection line, and the second ground selection transistors GSTb thereof may be connected to the second ground selection line.

Memory cells placed at the same height from the substrate (or the ground selection transistors GSTa and GSTb) may be connected in common to the same word line, and memory cells placed at different heights therefrom may be connected to different word lines. For example, the first to eighth memory cells MC1 to MC8 in cell strings CS11, CS12, CS21, and CS22 may be commonly connected the first to eighth word lines WL1 to WL8, respectively.

String selection transistors, belonging to the same row, from among the first string selection transistors SSTa at the same height may be connected to the same string selection line, and string selection transistors belonging to different rows may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL1a.

Likewise, string selection transistors, belonging to the same row, from among the second string selection transistors SSTb at the same height may be connected to the same string selection line, and string selection transistors belonging to different rows may be connected to different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

Even though not shown in FIGS. 12 and 13, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In an embodiment, dummy memory cells at the same height are connected with the same dummy word line, and dummy memory cells at different heights are connected with different dummy word lines. For example, the first dummy memory cells DMC1 may be connected with the first dummy word line DWL1, and the second dummy memory cells DMC2 may be connected with the second dummy word line DWL2.

In the first memory block BLK1, read and write operations may be performed by the row. For example, one row of the memory block BLK1 may be selected by the string selection lines SSL1a, SSL1b, SSL2a, and SSL2b.

For example, the cell strings CS11 and CS12 in the first row may be respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. Memory cells, belonging to the same height, from among memory cells of a cell string in a row driven by operating a word line may be selected. In selected memory cells, a read and write operation may be performed. The selected memory cells may constitute a physical page unit.

In the first memory block BLK1, memory cells may be erased by the memory block or by the sub-block. When erasing is performed by the memory block, all memory cells MC in the memory block BLK1 may be simultaneously erased according to an erase request. When erasing is performed by the sub-block, a portion of memory cells MC in the memory block BLK1 may be simultaneously erased according to an erase request, while the others thereof may be erase-inhibited. A low voltage (e.g., a ground voltage) may be supplied to a word line connected to erased memory cells MC, and a word line connected to erase-inhibited memory cells MC may be floated.

The first memory block BLK1 illustrated in FIG. 13 is an example. For example, the number of cell strings may be increased or decreased, and the number of rows of cell strings and the number of columns of cell strings may be increased or decreased according to the number of cell strings. In the first memory block BLK1, the number of cell transistors (GST, MC, DMC, SST, etc.) may be increased or decreased, and a height of the first memory block BLK1 may be increased or decreased according to the number of cell transistors (GST, MC, DMC, SST, etc.). Furthermore, the number of lines (GSL, WL, DWL, SSL, etc.) connected to cell transistors may be increased or decreased according to the number of cell strings (GST, MC, DMC, SST, etc.).

A nonvolatile memory device, a card controller, and a memory card according to the inventive concept may be packaged according to any of a variety of different packaging technologies. For example, a volatile and nonvolatile memory device and/or a memory controller according to an embodiment of the inventive concept may be mounted by using packages such as a package on package (PoP), a ball grid arrays (BGAs), chip scale packages (CSPs), a plastic leaded chip carrier (PLCC), a plastic dual in-line package (PUP), a die in waffle pack, a die in wafer form, a chip on board (COB), a ceramic dual in-line package (CERDIP), a plastic metric quad flat pack (MQFP), a small outline (SOIC), a shrink small outline package (SSOP), a thin small outline (TSOP), thin quad flatpack (TQFP), a system in package (SIP), a multi-chip package (MCP), a wafer-level fabricated package (WFP), and a wafer-level processed stack package (WSP).

While the inventive concept has been described with reference to exemplary embodiments, it will be apparent to those skilled in the art that various changes and modifications may be made without departing from the spirit and scope of the inventive concept.

What is claimed is:

1. A memory system, comprising:
   a nonvolatile memory electrically connected to a data bus;
   a dynamic random access memory (DRAM) electrically connected to the data bus, wherein the DRAM is configured to store data of a cache line comprising a plurality of cache units that caches data stored in the nonvolatile memory and to store a dirty flag for each of the cache units, which indicates whether the corresponding cache unit has a dirty state, where a first size of each cache unit is smaller than a second size of the entire cache line; and
   a memory controller configured to drive the DRAM as a cache memory and the nonvolatile memory as a main memory and to synchronize data of the cache line with data of the nonvolatile memory in units of the cache units based on the dirty flags,
   wherein the memory controller performs the synchronize by extracting tag information and the dirty flags from the cache line and copying data of one of the cache units of the first size from the DRAM across the data bus to the nonvolatile memory when the tag information indicates a cache hit has occurred and the corresponding read dirty flag of the one cache unit has the dirty state.

2. The memory system of claim 1, wherein the DRAM comprises:
   at least one DRAM device configured to store the data of the cache line and the dirty flags; and
   a cache controller configured to set one of the dirty flags based on an address provided from the memory controller.

3. The memory system of claim 2, wherein the DRAM device comprises:
   a first cell region configured to store the data of the cache line; and
   a second cell region configured to store the dirty flags.

4. The memory system of claim 3, wherein the DRAM device further comprises:
   a sense amplifier configured to write the dirty flags in the second cell region or to sense the written dirty flag.

5. The memory system of claim 1, wherein the memory controller sets the corresponding read dirty flag of the one cache unit to a clean state after completing the copying.

6. The memory system of claim 1, wherein a size of data input to the nonvolatile memory and output from the nonvolatile memory is greater than a size of data input to the DRAM and output from the DRAM.

7. The memory system of claim 6, wherein the first size of each of the cache units corresponds to a size of the data input to the DRAM and output from the DRAM, and the second size of the cache line corresponds to the size of the data input to the nonvolatile memory and output from the nonvolatile memory.

8. The memory system of claim 1, wherein the nonvolatile memory comprises at least one of an electrically erasable and programmable ROM (EEPROM), a NAND flash memory, a NOR flash memory, a phase-change RAM (PRAM), a resistive RAM (ReRAM), a ferroelectric RAM (FRAM), or a spin-torque magnetic RAM (STT-MRAM).

9. A cache management method of a memory system that comprises a nonvolatile memory and a dynamic random access memory (DRAM) connected to a data bus, the method comprising:
   storing data stored in the nonvolatile memory in a cache line of the DRAM comprising a plurality of cache units and performing a cache update operation in units of the cache units, where a first size of each cache unit is smaller than a second size of the entire cache line;
   storing a dirty flag for each of the cache units indicating whether each of the cache units is in a dirty state or a clean state;
   extracting tag information from the cache line;
   reading the dirty flags to detect which of the cache units have the dirty state;
   reading the cache units, which are detected as having the dirty state, from among the plurality of cache units from the DRAM when the tag information indicates a cache hit has occurred; and
   flushing the read cache units to the nonvolatile memory,
   wherein the flushing of one of the read cache units comprises copying data of one of the cache units of the first size from the DRAM across the data bus to the nonvolatile memory.

10. The method of claim 9, wherein the DRAM inputs or outputs data with a size corresponding to the first size of each cache unit, and the nonvolatile memory inputs or outputs data with the second size corresponding to the cache line.

11. The method of claim 9, wherein the DRAM has a memory region storing the dirty flags.

12. The method of claim 11, wherein the DRAM comprises:
   a first cell region configured to store one of the cache units; and
   a second cell region configured to store a dirty flag corresponding to the one cache unit.

13. The method of claim 11, wherein the DRAM comprises:
   a plurality of DRAM devices each configured to store the cache units; and
   at least one DRAM device configured to store the dirty flags corresponding to each of the cache units.

* * * * *